(12) United States Patent
Dai

(10) Patent No.: US 12,214,506 B2
(45) Date of Patent: Feb. 4, 2025

(54) METHOD AND SYSTEM FOR ROBOTIC ASSEMBLY

(71) Applicant: ABB Schweiz AG, Baden (CH)

(72) Inventor: Fan Dai, Zwingenberg (DE)

(73) Assignee: ABB Schweiz AG, Baden (CH)

( * ) Notice: Subject to any disclaimer, the term of this patent is extended or adjusted under 35 U.S.C. 154(b) by 566 days.

(21) Appl. No.: 17/401,342

(22) Filed: Aug. 13, 2021

(65) Prior Publication Data

US 2021/0370513 A1 Dec. 2, 2021

Related U.S. Application Data

(63) Continuation of application No. PCT/EP2019/054905, filed on Feb. 27, 2019.

(51) Int. Cl.
*B25J 9/16* (2006.01)

(52) U.S. Cl.
CPC ........... *B25J 9/1671* (2013.01); *B25J 9/1664* (2013.01); *B25J 9/1697* (2013.01)

(58) Field of Classification Search
CPC ....... B25J 9/1671; B25J 9/1664; B25J 9/1697
See application file for complete search history.

(56) References Cited

U.S. PATENT DOCUMENTS

| | | | |
|---|---|---|---|
| 11,383,380 B2* | 7/2022 | Bradski | B25J 9/162 |
| 2013/0211593 A1* | 8/2013 | Domae | B25J 9/1612 |
| | | | 700/258 |
| 2015/0120047 A1* | 4/2015 | Motoyoshi | B25J 9/1697 |
| | | | 901/30 |
| 2017/0136626 A1 | 5/2017 | Wang et al. | |
| 2018/0072523 A1* | 3/2018 | Peters | B25J 15/0052 |
| 2020/0246974 A1* | 8/2020 | Knoll | B25J 9/1664 |
| 2020/0269432 A1* | 8/2020 | Beinhofer | B25J 19/023 |

FOREIGN PATENT DOCUMENTS

| | | |
|---|---|---|
| CN | 105499953 A | 4/2016 |
| JP | 2008009899 A | 1/2008 |

OTHER PUBLICATIONS

Fallside F et al., "A prototype, integrated, CAD-based robotic assembly system," Proceedings of the International Conference on Robotics and Automation, May 1989, pp. 228-234, IEEE, Scottsdale, AZ, USA.

(Continued)

*Primary Examiner* — Kira Nguyen
(74) *Attorney, Agent, or Firm* — Leydig, Voit & Mayer, Ltd.

(57) ABSTRACT

A method for robotic assembly includes: receiving product data including product structure data and/or product geometry data of a product with a base component and at least one assembly part to be assembled; analyzing the product data to determine robot functions relating to functions of a robot for assembly of the product as determined robot functions; generating a robot program including assembly instructions dependent on the determined robot functions and the product data; and executing the generated robot program so as to identify and/or localize the at least one assembly part and assemble the product.

15 Claims, 2 Drawing Sheets

(56) References Cited

OTHER PUBLICATIONS

Thomas Garrett et al., "Learning Robotic Assembly from CAD," 2018 IEEE International Conference on Robotics and Automation (ICRA), May 2018, pp. 3524-3531, IEEE, Brisbane, QLD, Australia.

Sotiris Makris et al., "RFID driven robotic assembly for random mix manufacturing," Robotics and Computer-Integrated Manufacturing, Jun. 2012, pp. 359-365, Elsevier, Amsterdam, Netherlands.

Bruno Siciliano et al., "Visual Servoing," Robotics Modelling, Planning and Control, Dec. 2009, pp. 407-467, Springer, London, United Kingdom.

* cited by examiner

METHOD AND SYSTEM FOR ROBOTIC ASSEMBLY

CROSS-REFERENCE TO PRIOR APPLICATION

This application is a continuation of International Patent Application No. PCT/EP2019/054905, filed on Feb. 27, 2019, the entire disclosure of which is hereby incorporated by reference herein.

FIELD

The present disclosure relates to a method and a system for robotic assembly.

BACKGROUND

Programming industrial robot applications is still time consuming, and requires expert knowledge in the application domain and in the robotics domain. Attempts to generate robot application programs automatically or semi-automatically are more on the theoretical level, except the generation of robot motion paths based on CAD/CAM data. There are also many research work on the generation of assembly graphs, but not used in implementing intelligent robot functions. On the other hand, sensor-based object localization and object feature detection is widely used in the robotics domain, but using them for individual applications required often special knowledge and additional programming or configuration effort.

Therefore, there is a need for an improved method for robotic assembly.

SUMMARY

In an embodiment, the present invention provides a method for robotic assembly, comprising: receiving product data comprising product structure data and/or product geometry data of a product with a base component and at least one assembly part to be assembled; analyzing the product data to determine robot functions relating to functions of a robot for assembly of the product as determined robot functions; generating a robot program comprising assembly instructions dependent on the determined robot functions and the product data; and executing the generated robot program so as to identify and/or localize the at least one assembly part and assemble the product.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
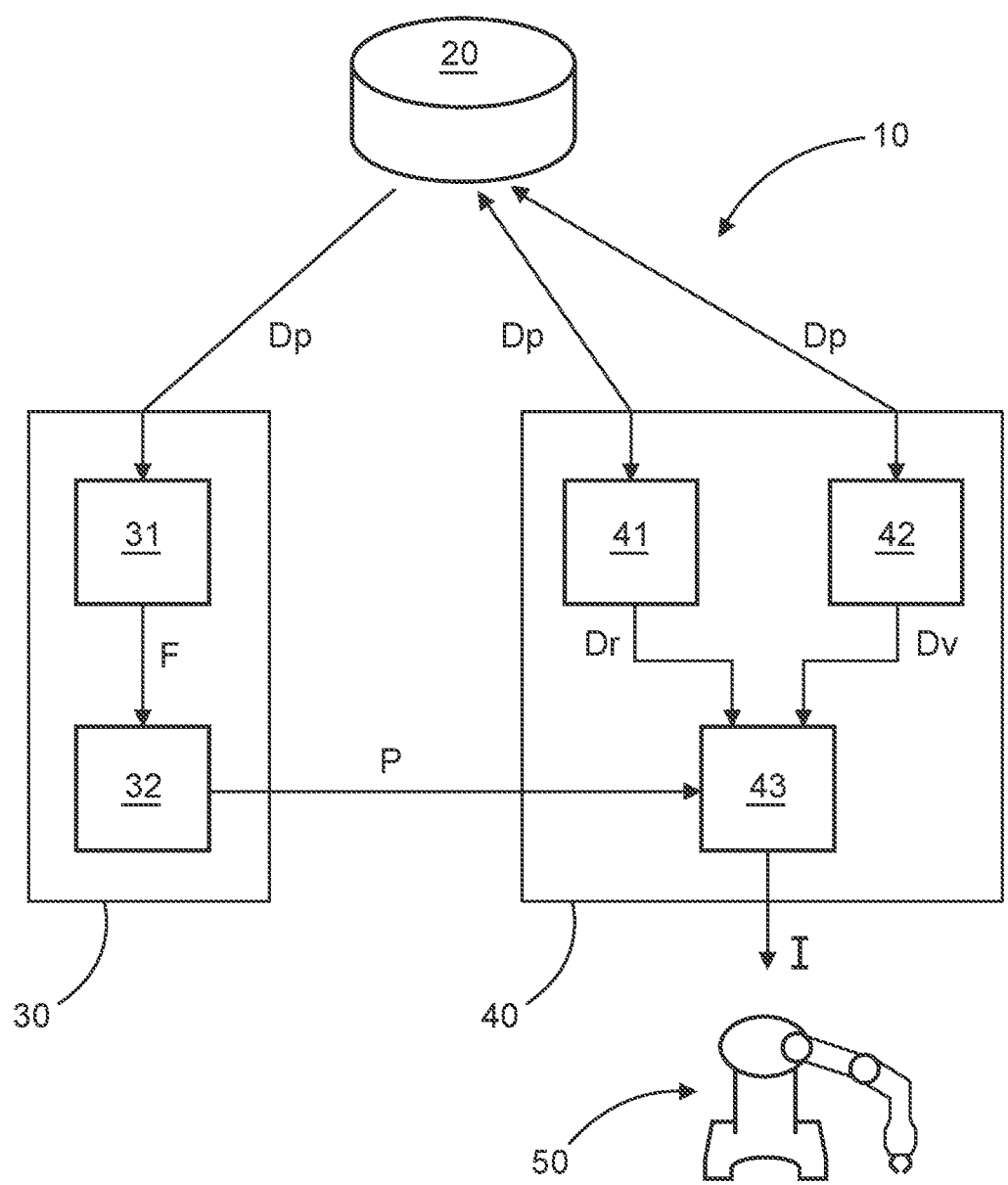
FIG. 1 shows a flow chart of a system for robot assembly.

In an embodiment, the present invention provides a method for robotic assembly, comprising the steps:
receiving product data, comprising product structure data and/or product geometry data of a product with a base component and at least one assembly part to be assembled;
analysing the product data, thereby determining robot functions relating to functions of a robot for assembly of the product;
generating a robot program comprising assembly instructions dependent on the determined robot function and the product data; and
executing the generated robot program, thereby identifying and/or localizing the at least one assembly part and assembling the product.

Preferably, functions of the robot for assembly of the product comprise pushing, snapping and/or screwing.

The term "assembly instructions", as used herein, relates to instructions for sequences of a robot in order to assemble the product. Assembling the product preferably comprises picking up the at least one assembly part, moving the at least one assembly part to an assembly location of the base component and/or connecting the at least one assembly part with the base component.

Preferably, dependent on the structure data, product hierarchy data is determined, relating to the hierarchy of the individual members of the product. Dependent on the hierarchy of the individual members of the product preferably the base component can be distinguished from the assembly parts.

When analysing the product data, the base component and the at least one assembly part is determined from the product data, preferably from the product hierarchy data.

Preferably, the product data comprises data, which is relative to the members of the product. For example, the product data comprises location data of the members of the product relative to another. The product data preferably comprises workspace data, relating to design and/or layout of a workspace for assembling the product. The product data may comprise further data about the product and/or the product members.

Preferably, the robot program is generated fully automatically.

Thus, an improved method for combining assembly instruction generation with sensor-based object detection and localization for efficient and automatic identification of the at least one assembly part and localization of the at least one assembly part is provided.

Thus, the effort for programming robotic assembly applications is minimized.

In a preferred embodiment, the method comprises the step:
receiving product data from CAD data of the product.

The CAD data of the product preferably comprises 2D models and/or 3D models of the product and/or members of the product like assembly parts or base component.

CAD systems support definition and analysis of assembly sequences. Preferably, at least product hierarchy data based on product structure data and product geometry data can be determined based on the CAD data.

Thus, an improved method for combining CAD based assembly instruction generation with sensor-based object detection and localization for efficient and automatic identification of the at least one assembly part and localization of the at least one assembly part is provided.

In a preferred embodiment, the method comprises the step:
identifying the at least one assembly part of the product by a RFID reader while executing the robot program.

The assembly parts are preferably provided with RFID transponders, at least storing a part identification number of the respective assembly part. The RFID reader preferably reads out the RFID transponders, thereby identifying the at least one assembly part.

Thus, an improved identification of the at least one assembly part can be provided.

In a preferred embodiment, the method comprises the step:

localizing the at least one assembly part of the product by a vision system while executing the robot program.

Thus, an improved localization of the at least one assembly part can be provided.

In a preferred embodiment, the method comprises the steps:

determining a CAD model of the at least one assembly part from the product data; and matching a 3D image of the vision system to the determined CAD model of the at least one assembly part.

Thus, an improved localization of the at least one assembly part can be provided In a preferred embodiment, analysing the product data comprises creating a local coordinate system for the base component, creating a local coordinate system for the at least one assembly part, determining a start pose of the at least one assembly part, determining a direction of the at least one assembly part and/or determining a picking pose of the at least one assembly part.

Preferably, the start pose of the at least one assembly part, the direction of the at least one assembly part and/or the picking pose of the at least one assembly part are specifications relative to one another and/or relative to the base component. The start pose and/or the direction preferably relate to an assembly motion of the robot.

Thus, an improved method for combining assembly instruction generation with sensor-based object detection and localization for efficient and automatic identification of the at least one assembly part and localization of the at least one assembly part is provided.

In a preferred embodiment, the assembly instructions comprise finding the at least one assembly part, adjusting a reference coordinate system to the local coordinate system of the base component, adjusting the picking pose of the at least one assembly part, picking the at least one assembly part with the corresponding picking pose, assembling the at least one assembly part with the corresponding start pose and direction of the at least one assembly part and/or updating the product data.

Based on the relative data, when the base component is found, the local coordinate system for the base component and the local coordinate system for the at least one assembly part are adjusted.

Thus, an improved method for combining assembly instruction generation with sensor-based object detection and localization for efficient and automatic identification of the at least one assembly part and localization of the at least one assembly part is provided.

In a preferred embodiment, the method comprises the step:

determining and/or adjusting parameters of the robot function while executing the robot program.

Preferably, the robot program comprises parameters which can be adjusted while executing the robot program. When the at least one assembly part is identified and localized, the start pose, direction and/or picking pose, which are relative poses, can be adjusted to absolute values independent from another.

Thus, an improved method for combining assembly instruction generation with sensor-based object detection and localization for efficient and automatic identification of the at least one assembly part and localization of the at least one assembly part is provided.

According to an aspect, the system for robotic assembly, comprises a database, comprising product data, comprising product structure data and/or product geometry data of a product to be assembled, a control unit, configured for analysing the product data, thereby determining robot functions relating to functions of a robot for assembly of the product and generating a robot program comprising assembly instructions dependent on the determined robot function and the product data and a robot system, comprising a robot controller, configured for executing the generated robot program, thereby identifying and localizing the at least one assembly part and assembling the product.

Thus, an improved system for combining assembly instruction generation with sensor-based object detection and localization for efficient and automatic identification of the at least one assembly part and localization of the at least one assembly part is provided.

In a preferred embodiment, the product data comprise CAD data of the product.

Thus, an improved system for combining CAD based assembly instruction generation with sensor-based object detection and localization for efficient and automatic identification of the at least one assembly part and localization of the at least one assembly part is provided.

In a preferred embodiment, the robot system comprises a RFID reader system with at least one RFID reader, configured for identifying the at least one assembly part of the product.

Thus, an improved identification of the at least one assembly part can be provided.

In a preferred embodiment, the robot system comprises a vision system, preferably with at least one camera and/or a data processing unit, configured for absolutely localizing an assembly part of the product.

The camera preferably is a 3D camera.

Thus, an improved localization of the at least one assembly part can be provided.

In a preferred embodiment, the at least one assembly part is provided with a RFID transponder.

Each assembly part is provided with a RFID transponder. The RFID transponder is preferably disposed directly on the assembly part. The RFID transponder alternatively is disposed on a container storing the assembly part and/or feeding system for feeding the assembly part. Every container preferably contains only assembly parts of the same type. Containers and feeding system are especially suitable for relatively small assembly parts. The RFID transponder preferably stores at least a part identification numbers of the assembly part.

The RFID transponder can be identified by the RFID reader system in order to identify the assembly part provided with the RFID transponder.

Thus, an improved identification of the at least one assembly part can be provided.

The present invention also relates to a computer program product including computer program code for controlling one or more processors of a device adapted to be connected to a communication network and/or configured to store a standardized configuration representation, assembly particularly, a computer program product including a computer readable medium containing therein the computer program code.

Preferably, the functional modules and/or the configuration mechanisms are implemented as programmed software modules or procedures, respectively; however, one skilled in the art will understand that the functional modules and/or the configuration mechanisms can be implemented fully or assembly partially in hardware.

FIG. 1 shows a system 10 for robot assembly comprising a database 20, a control unit 30 and a robot system 40. The control unit 30 comprises an analysing unit 31 and a generation unit 32. The robot system 40 comprises a RFID reader system 41, a vision system 42 and a robot controller 43. The database contains product data Dp of a product 60 to be assembled. The product data Dp comprises product structure data and/or product geometry data of the product 60. For example, the product data Dp comprise CAD data of the product. The CAD data preferably relate to 3D models of the product and the members of the product. The product data Dp is provided to the control unit 30, in particular the analysing unit 31 of the control unit 30.

The analysing unit 31 analyses the product data Dp. Thus, robot functions F relating to functions of robot for assembly of the product are determined by the analysing unit 31. Additionally, the members of the product 60, preferably a base component 61 and at least one assembly part 62 can be determined from the product data Dp. The robot functions F are provided to the generation unit 32, which is configured for automatically generating a robot program P or a module of the robot program P. The robot program P is provided to the robot controller 43 of the robot system 40.

The robot controller 43 executes the provided robot program P. Thereby the at least one assembly part 62 is identified and localized. The assembly part 62 is identified by the RFID reader system 41 and localized by the vision system 42. The RFID reader system 41 and the visions system 42 are provided with the product data Dp from the database 20. In particular, the layout and design of the workspace, a start pose of the assembly part 62 and/or the picking pose of the assembly part 62 for assembly of the product is provided to the RFID reader system 41 and the vision system 42. Thus, the RFID reader system 41 and the vision system 42 have a rough estimation of the location of the assembly part 62. The RFID reader system 41 identifies the assembly part 62 and provides RFID data Dr relating to the identity of the assembly part 62 to the robot controller 43. The vision system 42 localizes the assembly part 62 and provides vision data Dv relating to the location of the assembly part 62 to the robot controller 43. Based on the RFID data Dr, the vision data Dv and the robot program P, the robot 50 for the assembly of the product 60 can be controlled, preferably by robot instructions I provided by the robot controller 43. The robot program P starts with a set of parameters in accordance to the product data Dp. As soon as the RFID reader system 41 and the vision system 42 are activated and identify and/or localize the assembly part 62, the parameters of the robot program P are updated based on the RFID data Dr and/or the vision data Dv. Additionally, the product data Dp from the database 20 can be adjusted based on the RFID data Dr and/or the vision data Dv.

Figure 2:
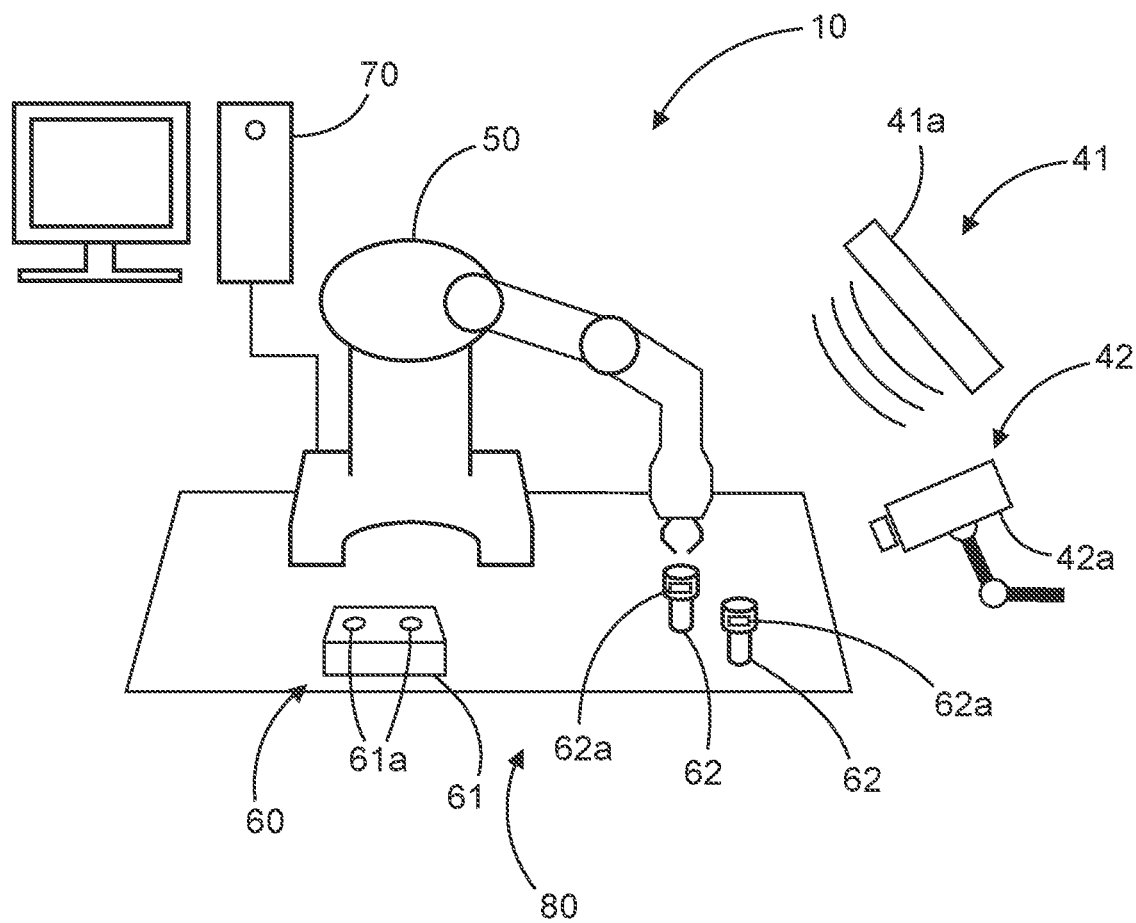
FIG. 2 shows a schematic view of a system for robot assembly.

FIG. 2 shows a schematic view of a system 10 for robot assembly. The system 10 comprises a RFID reader system 41, a vision system 42, a robot 50 for assembly of a product 60, a computer 70 and a robot workspace 80. The robot 50 and the product 60 are disposed on the robot workspace 80. The product 60 comprises a base component 61 with two openings 61a, which in this example are the assembly locations where the assembly parts 62 need to be inserted to assemble the product 60. The product 60 further comprises two assembly parts 62, which are configured as screws. The assembly of the product 60 comprises screwing the two assembly parts 62 into the openings 61a of the base component 61, respectively.

The assembly parts 62 are located at pre-defined locations or regions within the robot workspace 80. This information relates to the product data Dp, which are provided by the computer 70.

The assembly parts 62 may be supplied to the robot workspace 80 manually and/or using a feeding system.

Each of the two assembly parts 62 are provided with a RFID transponder 62a. The RFID transponders 62a are preferably disposed directly on the assembly part 62. However, the RFID transponders 62a may also be disposed on a container and/or feeding system for each type of assembly part 62. This is especially suitable for relatively small assembly parts. The RFID transponders 62a store at least the part identification numbers of the assembly parts 62.

The RFID reader system 41 comprises at least one RFID reader 41a. The RFID reader system 41 is configured for reading at least part of the identification numbers of the respective assembly parts 62. The RFID reader system 41 can obtain further information, in particular product data, from the database 20. The RFID reader system 41 is connected to the robot controller 43.

The vision system 42 comprises at least one camera 42a, in particular a 3D camera, as well as a data processing unit for determining the vision data Dv.

An exemplary method for robotic assembly comprises that a control unit 30, in this case a robot program generation software, retrieves from a database 20 the product data Dp, to be assembled by the robot system 10, where this can be triggered by an upstream system, or by a human operator via a user interface. The control unit 20 analyses the product data Dp and obtains at least the following information:

Firstly, the base component 61 is obtained. Therefore, a local coordinate system is created, if not already existing in the product data Dp obtained from the database 20.

Secondly, the assembly parts 62, to be inserted, in this case screwed into the openings 61a of the base component 61, is obtained. Therefore, a local coordinate system for each assembly part 62 is created, if not already existing in the product data Dp obtained from the database 20. A start pose and a direction for insertion relative to the base component 61 is obtained. Optionally, also a picking pose, which is a tool pose relative to the assembly part 62, is obtained.

The control unit 30, in particular the generation unit 32, automatically generates a robot program module P calling the following assembly instructions I. Finding the assembly parts 62, for example an assembly part identification number and/or an assembly part location. If at least the base component 61 is found, adjusting a reference coordinate system of the assembly part 62 to the base components 61 coordinate system. If assembly parts 62 to be inserted are found, adjusting a picking pose to the actual pose of the assembly part 62. If the base component 61 is found and at least one assembly part 62 to be inserted is found, picking the assembly part 62 with the corresponding pick pose. Inserting the assembly part 62 with the corresponding start pose and direction of insertion. Updating product data Dp in the database 20 and/or on the RFID transponders 62a.

The robot controller 40 executes the generated robot program P, calling the above mentioned assembly instructions I. Finding the assembly parts 62 is done by the RFID reader system 41 that detects the presence of assembly parts 62. RFID transponders 62a are placed on the assembly parts 62 and/or on container of assembly parts 62, when a set of small assembly parts 62 are delivered together. At least an assembly part identification number is stored on the RFID transponder 62a. In case of RFID transponders on a container, a number of assembly parts 62 and a pattern for placing assembly parts 62 in the container are stored either on the RFID transponder 62a or in the database 20.

If available, pre-defined locations of the assembly parts 62 or assembly part containers are received from the database 20, for example a workspace layout.

Multiple RFID readers 41a with defined detection ranges may be placed at different positions to roughly locate the assembly parts 62, if workspace layout data is not available.

If necessary, the vision system 42 detects the location of the assembly parts 62 and/or corrects, or in other words updates, the pre-defined product data Dp, in particular location data to match the real installation. Therefore, a CAD model of the assembly parts 62 is received from the database 20. A 3D image is matched to the CAD models of assembly parts 62. In case of assembly parts 62 fed with containers, the vision system 42 can also detect the presence of assembly parts 62 within the container. The poses and reference coordinate system is adjusted accordingly using the above obtained part locations and the relative poses of the assembly parts 62 from the database 20.

The matching of the 3D image to the CAD models of the assembly parts 62 can be done more efficiently by using sub-portions of the image only, knowing the rough position of the assembly parts 62 from the product data Dp, in particular the CAD data and/or by using depth thresholds, and largely reduce a dimension of model matching when assembly parts 62 are supplied in known orientations only.

Figure 3:
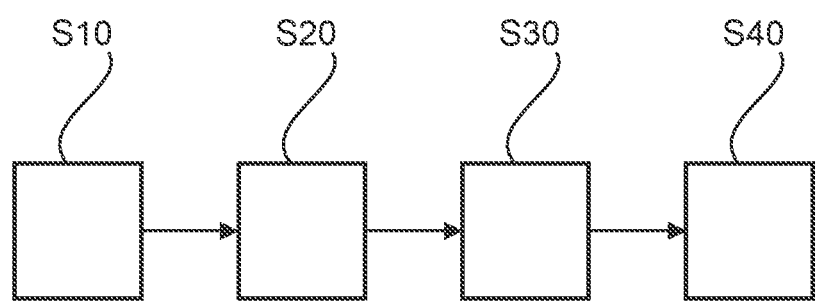
FIG. 3 shows a flow chart of a method for robot assembly.

FIG. 3 shows a flow chart of a method for robot assembly. In step S10, product data Dp is received, comprising product structure data and/or product geometry data of a product 60 with a base component 61 and at least one assembly part 62 to be assembled. In step S20, the product data Dp is analysed, thereby determining robot functions F relating to functions of a robot 50 for assembly of the product 60. In step S30, a robot program P comprising assembly instructions I dependent on the determined robot function F and the product data Dp is generated. In step 40, the generated robot program P is executed, thereby identifying and localizing the at least one assembly part 62 and assembling the product 60.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS 10 system
20 database
30 control unit
31 analysing unit
32 generation unit
40 robot system
41 RFID reader system
41a RFID reader
42 vision system
42a 3D camera
43 robot controller
50 robot
60 product
61 base component
61a opening
62 assembly part
62a RFID tag
70 computer
80 workspace
Dp product data
Dr RFID data
Dv vision data
I assembly instructions
P robot program
F robot functions
S10 receiving product data
S20 analysing the product data
S30 generating a robot program
S40 executing the robot program

What is claimed is:

1. A method for robotic assembly, comprising:
receiving product data comprising product structure data and product geometry data of a product with a base component and at least one assembly part to be assembled;
analyzing the product data to determine robot functions relating to functions of a robot for assembly of the product as determined robot functions;
generating a robot program comprising assembly instructions dependent on the determined robot functions and the product data; and
executing the generated robot program so as to identify and/or localize the at least one assembly part and assemble the product.

2. The method of claim 1, further comprising:
receiving product data from computer aided design (CAD) data of the product.

3. The method of claim 1, further comprising:
identifying the at least one assembly part of the product by a radio frequency identification (RFID) reader system while executing the robot program.

4. The method of claim 1, further comprising:
localizing the at least one assembly part of the product by a vision system while executing the robot program.

5. The method of claim 4, further comprising:
determining a computer aided design (CAD) model of the at least one assembly part from the product data; and matching a 3D image of the vision system to the determined CAD model of the at least one assembly part.

6. The method of claim 1, wherein analyzing the product data comprises:
creating a local coordinate system for the base component,
creating a local coordinate system for the at least one assembly part,
determining a start pose of at least one assembly part,
determining a direction of the at least one assembly part, and
determining a picking pose of the at least one assembly part.

7. The method of claim 6, wherein the assembly instructions comprise:
finding the at least one assembly part,
adjusting a reference coordinate system to the local coordinate system of the base component,
adjusting the picking pose of the at least one assembly part,
picking the at least one assembly part with the corresponding picking pose,
assembling the at least one assembly part with the corresponding start pose and direction of the at least one assembly part, and/or
updating the product data.

8. The method of claim 1, further comprising:
determining and/or adjusting parameters of the robot function while executing the robot program.

9. The method of claim 1, further comprising determining product hierarchy data based on the product structure data, the product hierarchy data associated with individual members of the product.

10. A system for robotic assembly, comprising:
a database comprising product data comprising product structure data and product geometry data of a product with a base component and at least one assembly part to be assembled;
a control unit configured to analyze the product data so as to determine robot functions relating to functions of a robot for assembly of the product as determined robot functions and to generate a robot program comprising assembly instructions dependent on the determined robot functions and the product data as a generated robot program; and
a robot system comprising a robot controller configured to execute the generated robot program so as to identify and localize the at least one assembly part and to assemble the product.

11. The system of claim 10, wherein the product data comprise computer aided design (CAD) data of the product.

12. The system of claim 10, wherein the robot system further comprises a radio frequency identification (RFID) reader system with at least one RFID reader configured to identify the at least one assembly part of the product.

13. The system of claim 10, wherein the robot system further comprises a vision system configured to localize the at least one assembly part of the product.

14. The system of claim 13, wherein the vision system comprises at least one camera and/or a data processing unit.

15. The system of claim 10, wherein the at least one assembly part is provided with a radio frequency identification (RFID) transponder.

* * * * *